No. 627,908. Patented June 27, 1899.
H. P. DAVIS & F. CONRAD.
ELECTRICAL MEASURING INSTRUMENT.
(Application filed Apr. 1, 1899.)
(No Model.) 3 Sheets—Sheet 3.
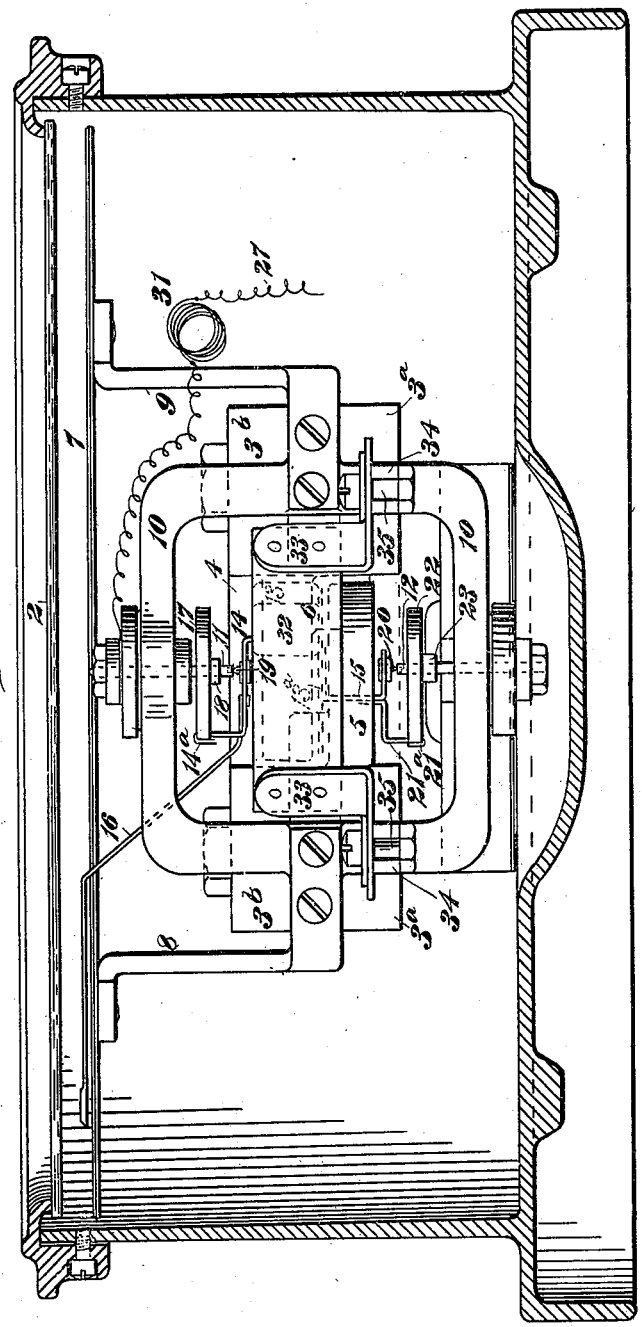
WITNESSES: INVENTORS
Harry P. Davis
& Frank Conrad
BY
ATTORNEY.

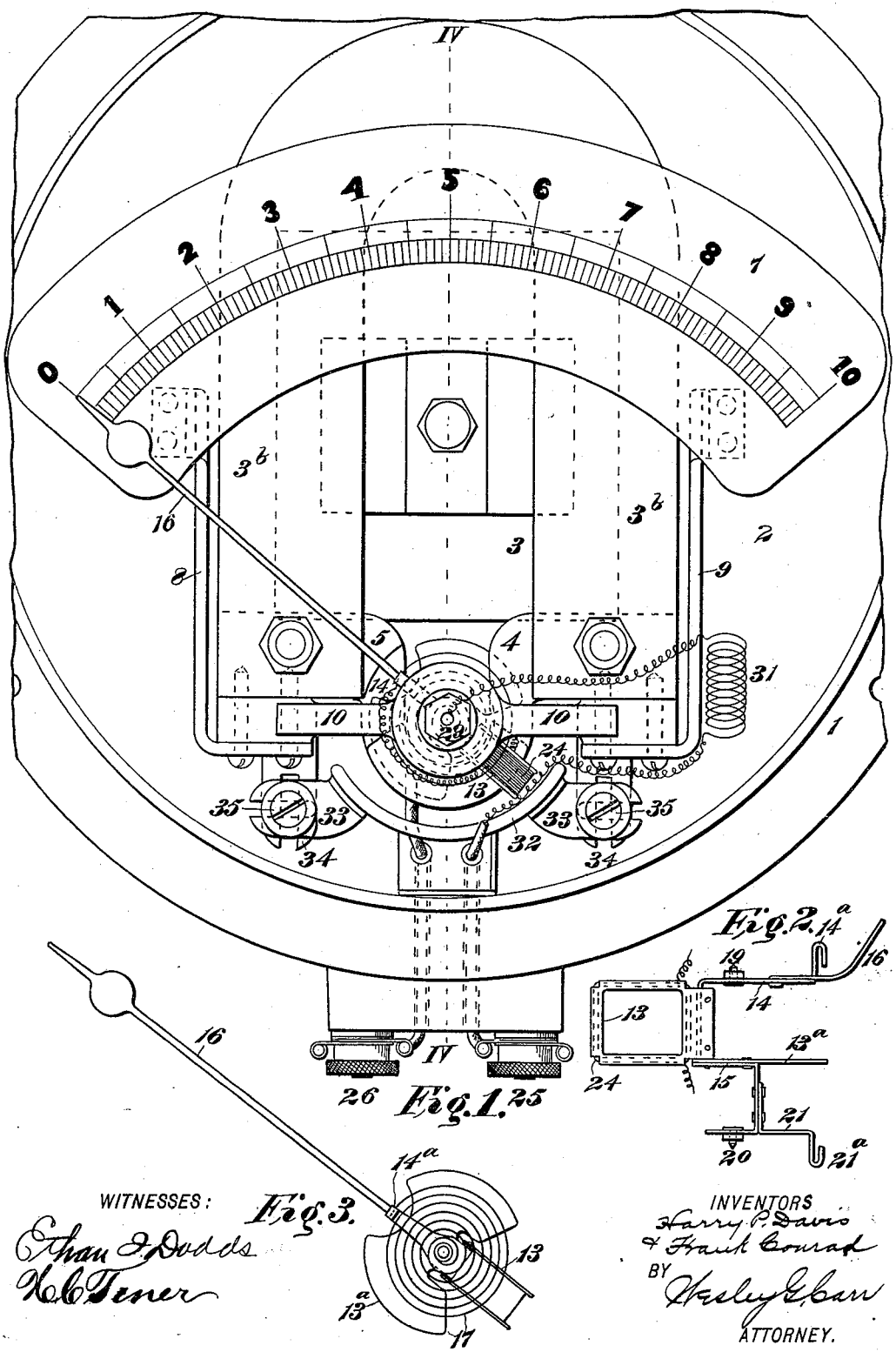

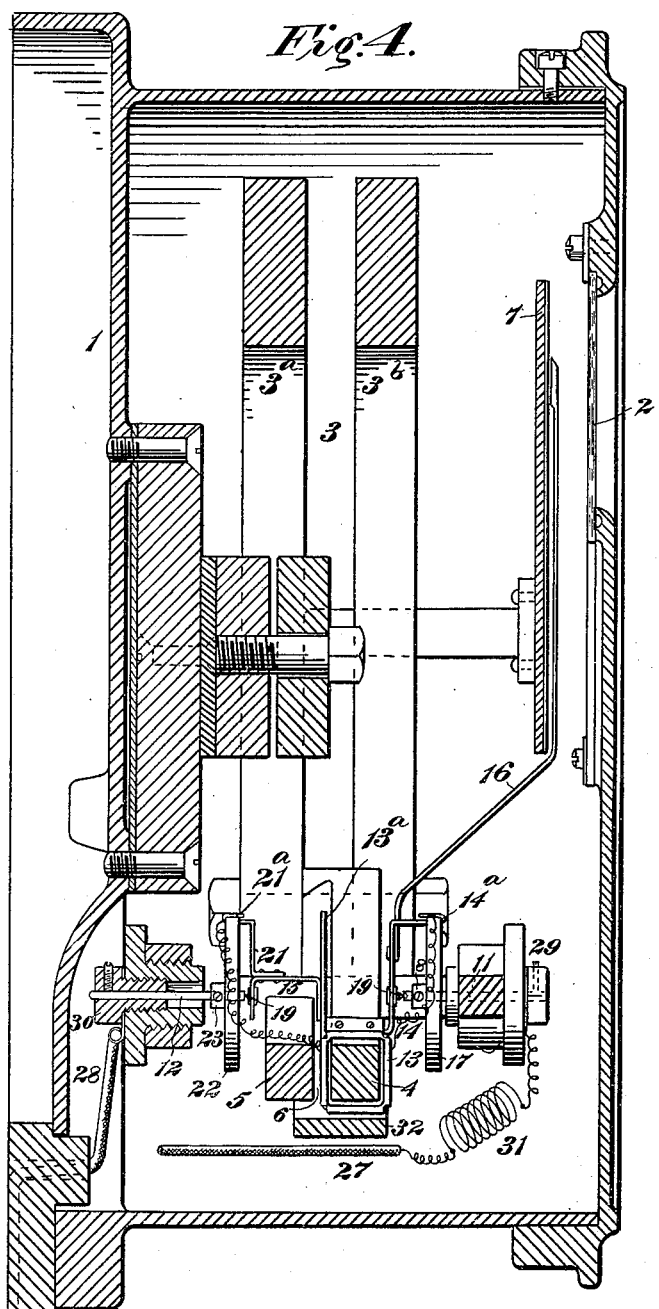

UNITED STATES PATENT OFFICE.

HARRY P. DAVIS, OF PITTSBURG, AND FRANK CONRAD, OF WILKINSBURG, PENNSYLVANIA, ASSIGNORS TO THE WESTINGHOUSE ELECTRIC AND MANUFACTURING COMPANY, OF PENNSYLVANIA.

ELECTRICAL MEASURING INSTRUMENT.

SPECIFICATION forming part of Letters Patent No. 627,908, dated June 27, 1899.

Application filed April 1, 1899. Serial No. 711,402. (No model.)

*To all whom it may concern:*

Be it known that we, HARRY P. DAVIS, residing at Pittsburg, and FRANK CONRAD, residing at Wilkinsburg, in the county of Allegheny and State of Pennsylvania, citizens of the United States, have invented a new and useful Improvement in Electrical Measuring Instruments, (Case No. 816,) of which the following is a specification.

Our invention relates to direct-current electrical measuring instruments, and particularly to instruments of this general class which are employed for indicating the instantaneous values of current or electromotive force in any given circuit, as distinguished from instruments which are employed for registering or recording the total amount of current or energy traversing a given circuit during a specific interval of time.

The object of our invention is to provide an instrument which shall be simple and compact in construction, which shall have a uniform scale, be as nearly as possible dead-beat, and the moving parts of which shall be light and free from liability to destruction or disarrangement.

In the accompanying drawings, Figure 1 is a face view of the instrument, which may be regarded as either a front elevation or a plan view, according to whether the instrument is designed for switchboard use or to be portable, the cover being removed and parts of the frame or casing being broken away. Figs. 2 and 3 are detail views of the principal movable members of the instrument. Fig. 4 is a sectional view taken on line IV IV of Fig. 1, the indicating-pointer being shown, however, in a different position and its controlling-springs being shown in elevation. Fig. 5 is a sectional view on a plane at right angles to that of Fig. 4, the operative portions of the instrument being shown in plan, looking upward, assuming that the device is a switchboard instrument.

Referring now to the details of construction as illustrated in the drawings, the casing 1 of the instrument may be of any material suitable to the relations in which the instrument is to be used and of any convenient or desired shape, the front being provided with a plate of glass or other transparent material 2, which may be supported in position in any convenient manner and may extend over the whole or only a portion of the front casing, as may be desired. The field-magnet 3 of the instrument comprises two permanent magnets $3^a$ and $3^b$, which, as shown, are of approximately horseshoe shape; but the shape may obviously be varied from that shown, if desired. Furthermore, it is not essential that the field-magnet be made in two parts. Clamped between one pair of magnet-arms, which are of the same polarity, is the base portion of a polar extension 4, the projecting portion of which extends toward the arms of the magnet of the opposite polarity through approximately a semicircumference. Clamped between the ends of the other two adjacent arms is the base portion of a similar piece 5, which constitutes a polar projection of similar form and dimensions. The extension 5 is in a plane parallel to that of the extension 4 and is separated thereform by an air-gap 6. These polar extensions 4 and 5 may be of different length from that shown, depending upon the length of the scale desired for the instrument; but in most cases the dimensions shown will be suitable for practical purposes.

The scale-plate 7 of the instrument is supported by two brackets 8 and 9, fastened by means of screws or bolts to the respective ends of the field-magnet 3, and clamped between the end of each bracket and the corresponding end of the magnet is one side of a rectangular frame 10, which supports the bearing-pins 11 and 12 for the movable member of the instrument.

The movable member of the instrument comprises a spool or shell 13, preferably stamped from sheet aluminium or other light conducting metal, a damper-plate $13^a$, and two arms 14 and 15, preferably of the same material, either formed integral with the shell or riveted thereto. It will be seen that the shell 13 surrounds or is threaded upon the polar extension 4, and that the damper-plate $13^a$ extends into the air-gap 6 between the polar extensions. Fastened to arm 14 is a pointer 16, the free end of which moves over the scale 7. The free end of arm 14 is bent into the form of a hook 14ª, in which is clamped the insulated outer end of a spiral spring 17, the inner end of this spring being fastened to a collet 18, rigidly mounted on the bearing-pin 11. This arm 14 is also provided with a steel point 19, which has its bearing in a jewel set in the end of the pin 11. The arm 15 is bent so as to form two right angles and provide a support in its free end for a steel point 20, which has its bearing in a jewel set in the end of bearing-pin 12. Riveted to this arm 15 is a supplemental arm 21, the end of which is bent to form a hook 21ª, the insulated outer end of a second spiral spring 22 being clamped in this hook and the inner end of the spring being fastened to a collet 23, rigidly mounted on bearing-pin 12.

The actuating or measuring coil 24 for the instrument is wound upon the spool or shell 13 and has its respective terminals connected to the outer ends of the spiral springs 17 and 22. The binding-posts 25 and 26 of the instrument for connecting the same to the circuit, the current or electromotive force of which is to be measured, are connected by means of wires 27 and 28 to the respective bearing-pins 11 and 12 by means of suitable binding-posts 29 and 30, a current-adjusting resistance 31 being included in conductor 27.

A shield 32, made of magnetic material, is provided in order to equalize the magnetic field of the instrument, it being of curved form and constituting a segment of a hollow cylinder. This shield is provided with two angular ears 33, the free ends of which are slotted and extend over corresponding slotted brackets 34, supported by the ends of magnet 3 or other stationary portions of the instrument, and through each of these pairs of slots extends a bolt 35 for fastening the shield in position. By loosening these bolts the shield may be adjusted in a plane parallel to those of the polar extensions to any position desired in order to provide the proper condition of magnetic field for the movable member of the instrument. It will be seen that the form and arrangement of the stationary portions of the instrument are such as to economize space and provide a durable as well as convenient arrangement of parts.

By forming the shell or spool 13 of a single sheet of metal and so fastening the damper-plate 13ª thereto as to make the two substantially a single element electrically we provide a very desirable damping device, which is effective in operation and at the same time so light and well balanced that there is a minimum amount of weight on the bearings, and consequently a minimum degree of frictional resistance to the movement of the operating and indicating mechanism. The shape of the damper-plate is made such as to substantially balance the moving parts upon the bearings and such as to give the required damping effect during the entire range of movement of the indicating-pointer.

By attaching the inner ends of the spiral springs 17 and 22 to stationary portions of the instrument substantially all of the weight of the springs is taken off the moving members of the instrument, and the bearings are thereby relieved of the friction due to the weight of the springs as ordinarily supported in this class of instruments.

It will be understood that the jewel-bearings might be mounted in the movable member and the coöperating points or pins in the stationary portion of the instrument without in any way departing from the invention. It will also be understood that other modifications may be made in the form or location and arrangement of parts without departing from the spirit and scope of the invention.

We claim as our invention—

1. In an electrical measuring instrument, a permanent magnet having curved polar extensions superimposed in parallel planes and separated by an air-gap, in combination with a combined bobbin-shell and damper-plate, said plate being located between the polar extensions and said shell surrounding one of said extensions and provided with an actuating-coil and an indicating device.

2. In an electrical measuring instrument, a permanent magnet constituting the field-magnet of the instrument and provided with a pair of superimposed polar extensions separated by an air-gap, in combination with a combined metal shell and damper-plate, said shell surrounding one of said polar extensions and said plate located and moving in said air-gap.

3. In an electrical measuring instrument, a permanent magnet having a pair of superimposed, oppositely-projecting polar extensions separated by an air-gap, in combination with a shell or spool provided with a coil for carrying the current to be measured and threaded upon one of the polar extensions, a damper-plate extending from said shell or spool into the air-gap and means for supporting said shell and damper-plate for circumferential movement in accordance with the current or electromotive force traversing said coil.

4. In an electrical measuring instrument, a permanent magnet having superimposed polar extensions separated by an air-gap, in combination with a shell and a damper-plate constituting a single conducting-body, said shell being threaded upon one of said polar projections and said plate projecting into said air-gap, a measuring-coil on said shell, an indicating-pointer and means for so supporting said parts that they may move circumferentially in accordance with the current or electromotive force traversing said coil.

5. In an electrical measuring instrument, the combination with a permanent magnet having polar extensions, of an actuating-coil threaded upon one of said extensions and journaled in suitable bearings to circumferentially move thereon, and a spiral spring tending to hold said coil in its initial position, the weight of said spring being supported by a stationary part of the instrument.

6. In an electrical measuring instrument, the combination with the movable member of the indicating mechanism, an actuating-coil and a combined supporting and damping device, of a spiral spring interposed between said device and a stationary part of the instrument, the weight of said spring being supported by said stationary part.

7. In an electrical measuring instrument, the combination with a permanent magnet having curved polar extensions separated by an air-gap, of a measuring-coil, a combined supporting and damping frame threaded upon one of said extensions and projecting into said air-gap, jewel-bearings for said frame and a spiral spring supported by a stationary portion of the instrument and connecting the same to said supporting and damping frame.

8. In an electrical measuring instrument, the combination with a permanent magnet having superimposed polar extensions separated by an air-gap, of a measuring-coil surrounding one of said extensions, a support for said coil provided with a damper-plate, one or more spiral springs interposed between said support and a stationary part of the instrument, the weight of said spring or springs being supported by said stationary part, and means for indicating the degree of movement of the coil and its support in opposition to said spring or springs.

9. In an electrical measuring instrument, the combination with a permanent magnet having superimposed polar extensions separated by an air-gap, of a measuring-coil surrounding one of said extensions and supported in jewel-bearings, and one or more spiral springs supported by the instrument-frame and connected at one end to said coil.

In testimony whereof we have hereunto subscribed our names this 30th day of March, 1899.

HARRY P. DAVIS.
FRANK CONRAD.

Witnesses:
WESLEY G. CARR,
H. C. TENER.